United States Patent
Isobe et al.

(10) Patent No.: US 9,707,653 B2
(45) Date of Patent: Jul. 18, 2017

(54) AUTOMATIC TOOL CHANGER OF MACHINE TOOL

(71) Applicant: FANUC Corporation, Yamanashi (JP)

(72) Inventors: Gaku Isobe, Yamanashi (JP); Masahiro Murota, Yamanashi (JP); Naoki Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 126 days.

(21) Appl. No.: 14/690,553

(22) Filed: Apr. 20, 2015

(65) Prior Publication Data

US 2015/0298270 A1    Oct. 22, 2015

(30) Foreign Application Priority Data

Apr. 22, 2014   (JP) ................. 2014-088391

(51) Int. Cl.
*B23Q 3/157* (2006.01)
*B23Q 3/155* (2006.01)
*B23Q 1/54* (2006.01)

(52) U.S. Cl.
CPC ....... *B23Q 3/15526* (2013.01); *B23Q 1/5406* (2013.01); *B23Q 3/15534* (2016.11); *B23Q 3/15706* (2013.01); *Y10T 483/1795* (2015.01)

(58) Field of Classification Search
CPC ......... Y10T 483/1752; Y10T 483/1755; Y10T 483/1757; Y10T 483/176; Y10T 483/179; Y10T 483/1793; Y10T 483/1795; Y10T 483/1798; Y10T 483/1882; Y10S 483/90; B23Q 3/15706; B23Q 3/15566; B23Q 3/15506; B23Q 3/15526

USPC .......................... 483/38–41, 900, 54–57, 67
See application file for complete search history.

(56) References Cited

U.S. PATENT DOCUMENTS

| | | | |
|---|---|---|---|
| 3,824,892 A | | 7/1974 | Bondie et al. |
| 4,304,040 A | * | 12/1981 | Staiger ............... B23Q 3/15526 211/1.55 |
| 4,610,074 A | * | 9/1986 | Katsube ................ B23B 39/205 29/26 A |
| 4,679,296 A | | 7/1987 | Watanabe et al. |
| 4,780,952 A | | 11/1988 | Babel et al. |

(Continued)

FOREIGN PATENT DOCUMENTS

| | | |
|---|---|---|
| CN | 87101752 A | 9/1987 |
| GB | 2255734 A * | 11/1992 |

(Continued)

OTHER PUBLICATIONS

Decision to Grant a Patent mailed Jul. 28, 2015, corresponding to Japanese patent application No. 2014-088391.

(Continued)

*Primary Examiner* — Erica E Cadugan
(74) *Attorney, Agent, or Firm* — Hauptman Ham, LLP

(57) ABSTRACT

A automatic tool changer of a machine tool including a magazine driving motor configured to turn a tool magazine has the magazine driving motor fixed to a non-movable unit of the machine tool and when the tool magazine rotationally moves to reach an approaching position to a spindle head, a tool magazine side power transmission unit and a magazine driving motor side power transmission unit are connected to perform a turning operation of the tool magazine.

3 Claims, 6 Drawing Sheets

(a)

(b)

(56) References Cited

U.S. PATENT DOCUMENTS

| | | | |
|---|---|---|---|
| 4,870,744 A | 10/1989 | Araki et al. | |
| 4,955,127 A * | 9/1990 | Suda | B23Q 3/15706 29/26 A |
| 7,387,600 B1 * | 6/2008 | Sun | B23Q 3/15706 483/39 |
| 2007/0225139 A1 | 9/2007 | Kojima et al. | |
| 2013/0331245 A1 * | 12/2013 | Koike | B23Q 3/15526 483/54 |
| 2013/0345034 A1 | 12/2013 | Liu | |
| 2015/0290755 A1 * | 10/2015 | Isobe | B23Q 3/15526 483/56 |

FOREIGN PATENT DOCUMENTS

| | | | |
|---|---|---|---|
| JP | 56-003161 A * | 1/1981 | |
| JP | 60-155338 A | 8/1985 | |
| JP | 60-232845 A | 11/1985 | |
| JP | S63-62630 A | 3/1988 | |
| JP | 2589476 B2 | 3/1997 | |
| JP | 2012-061526 A * | 3/2012 | |

OTHER PUBLICATIONS

Office Action in CN Patent Application No. 201510185785.9, dated Dec. 2, 2016.

* cited by examiner

Embodiment Wherein a Key 15 is Provided in the Tool Magazine Side Gear 10 and a Key Groove 14 is Provided in the Magazine Driving Motor Side Gear 11

FIG. 7

AUTOMATIC TOOL CHANGER OF MACHINE TOOL

RELATED APPLICATIONS

The present application claims priority to Japanese Application Number 2014-088391, filed Apr. 22, 2014, the disclosure of which is hereby incorporated by reference herein in its entirety.

BACKGROUND OF THE INVENTION

1. Field of the Invention

The present invention relates to a automatic tool changer capable of automatically replacing a tool used in a machine tool.

2. Description of the Related Art

Conventionally, automatic tool changers that automatically replace tools mounted on a spindle of machine tools have been used. Such a automatic tool changers apparatus has a plurality of tools necessary for work preset thereto and is configured to automatically replace a tool mounted on the spindle of the machine tool with a tool specified in accordance with the processing state by performing a turning operation of a tool magazine to index the tool and attaching/detaching the tool to/from the spindle.

FIGS. 4 and 5 are views showing a conventional automatic tool changer and a tool magazine is made rotationally movable in a direction allowing the tool magazine to approach/separate from a spindle head.

In such a automatic tool changer, the whole tool magazine can be moved from the neighborhood of the spindle head during processing and thus, a processing area can be made wider. In addition, the spindle head can be made larger than when the tool magazine is not movable and thus, the stiffness of the spindle can be increased.

JP 63-062630 A discloses a automatic tool changer of a machine tool in a mode in which a spindle motor is used to drive the tool magazine to turn, wherein the processing area is secured widely by making the tool magazine rotationally movable in a direction allowing the tool magazine to approach/separate from the spindle head.

Some automatic tool changers have been enabled to secure a processing area widely or to increase the stiffness of the spindle by making the tool magazine rotationally movable in a direction allowing the tool magazine to approach/separate from the spindle head.

However, according to the above conventional technology and the automatic tool changer of a machine tool disclosed in JP 63-062630 A, the position of a magazine driving motor changes with the movement of a shaft of the machine tool and thus, the tool magazine can perform a turning operation only when the tool magazine is in a position approaching the spindle head as a tool replacement position and also the shaft of the machine tool is in a predetermined position.

SUMMARY OF THE INVENTION

Therefore, an object of the present invention is to provide a automatic tool changer capable of turning a tool magazine when the tool magazine is in a position approaching a spindle head without being affected by the position of a shaft of a machine tool.

A automatic tool changer of a machine tool according to the present invention includes a spindle head rotatably supporting a spindle, a tool magazine including a plurality of grips configured to hold a tool on a circumference of the tool magazine, a pivot configured to turn the tool magazine and make the tool magazine index the tool, a rotating shaft configured to rotate the tool magazine in a direction making the tool magazine approach or separate from the spindle head, and a magazine driving motor configured to turn the tool magazine, wherein the magazine driving motor is fixed to a non-movable unit of the machine tool, the tool magazine includes a tool magazine side power transmission unit, the magazine driving motor includes a magazine driving motor side power transmission unit, and when the tool magazine rotationally moves and reaches an approaching position to the spindle head, the tool magazine side power transmission unit and the magazine driving motor side power transmission unit are connected.

With the above configuration, the magazine driving motor is fixed to the non-movable unit of the machine tool and therefore, the tool magazine side power transmission unit and the magazine driving motor side power transmission unit are connected by causing the tool magazine to rotationally move to a position approaching the spindle head, so that a turning operation of the tool magazine can be performed without being affected by the position of the shaft of the machine tool.

The tool magazine side power transmission unit may include a tool magazine side gear and the magazine driving motor side power transmission unit may include a magazine driving motor side gear, so that the tool magazine side power transmission unit and the magazine driving motor side power transmission unit are configured to be connected by the tool magazine side gear and the magazine driving motor side gear.

With the above configuration, the tool magazine and the magazine driving motor are gear-connected by causing the tool magazine to rotationally move to a position approaching the spindle head, so that a turning operation of the tool magazine can be performed without being affected by the position of the shaft of the machine tool.

One of the tool magazine and the magazine driving motor may include a key and the other may include a key groove, so that the tool magazine side power transmission unit and the magazine driving motor side power transmission unit are configured to be connected by the key and the key groove.

With the above configuration, the tool magazine and the magazine driving motor are connected by key coupling with the tool magazine being caused to rotationally move to a position approaching the spindle head, so that a turning operation of the tool magazine can be performed without being affected by the position of the shaft of the machine tool.

By including the above configuration, the present invention can provide a automatic tool changer capable of turning a tool magazine when the tool magazine is in a position approaching a spindle head without being affected by the position of a shaft of a machine tool.

BRIEF DESCRIPTION OF THE DRAWINGS

The above and other objects and features of the present invention will be apparent from the following embodiments with reference to appended drawings. Among these drawings, FIGS. 1 (*a*) and 1(*b*) area schematic view when a automatic tool changer according to an embodiment of the present invention is viewed from a side;

FIG. 7 is a schematic view showing still another embodiment.

DETAILED DESCRIPTION OF THE PREFERRED EMBODIMENTS

Hereinafter, a conventional technology will first be described.

Figure 4:
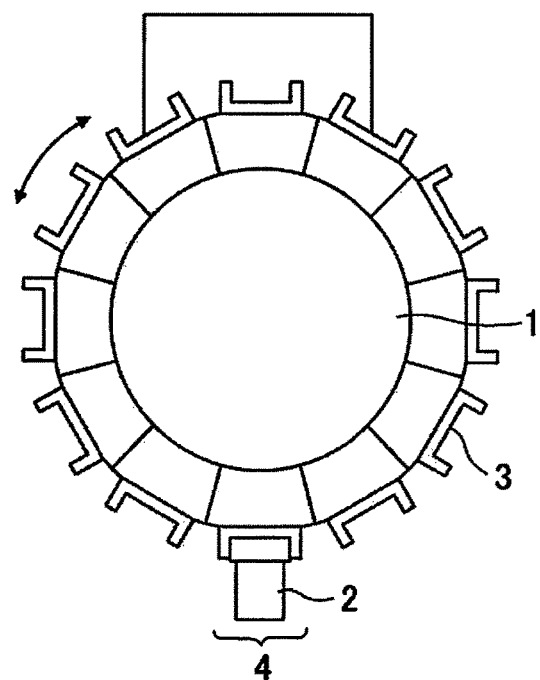
FIG. 4 is a schematic view when a machine tool including a conventional automatic tool changer is viewed from a front.

FIG. 4 is a schematic view when a machine tool including a conventional automatic tool changer is viewed from the front. Reference numeral 1 is a tool magazine and includes a plurality of grips 3 on a circumference thereof. Each of the grips 3 can grip a tool 2. The tool magazine 1 can perform a turning operation and indexes the tool 2 in a tool replacement position 4 as a position indicated by "4" in FIG. 4 for tool replacement.

Figure 5:
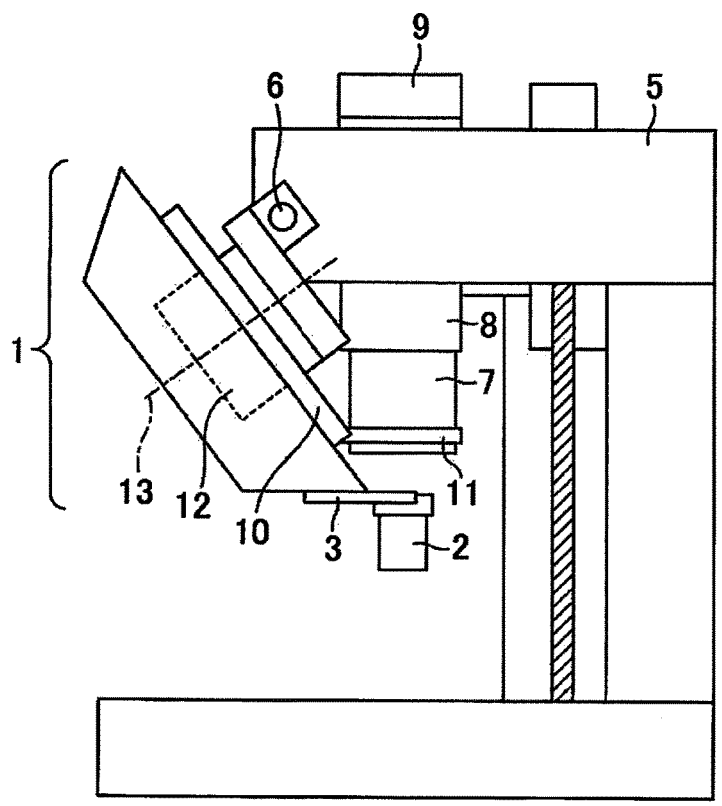
FIG. 5 is a schematic view when the machine tool including the conventional automatic tool changer is viewed from the side.

FIG. 5 is a schematic view when the machine tool including the conventional automatic tool changer is viewed from the side. Reference numeral 5 is a magazine support unit and a spindle head 8 and a spindle 7 are mounted on the magazine support unit 5 and the spindle head 8 includes a magazine driving motor 9. In addition, a magazine driving motor side gear 11 is provided like surrounding the spindle 7.

Next, reference numeral 1 is the tool magazine and is pivotally supported by the magazine support unit 5 on a fulcrum 6. The tool magazine 1 includes a tool magazine side gear 10 and a magazine shaft 12. In addition, a grip 3 is provided in a tip unit of the tool magazine 1 and the grip 3 can grip the tool 2. The tool magazine side gear 10 can rotate on a pivot with respect to the magazine shaft 12 and when the magazine driving motor side gear 11 and the tool magazine side gear 10 are engaged, the power from the magazine driving motor 9 is transmitted through the magazine driving motor side gear 11 and the tool magazine side gear 10 and the tool magazine 1 performs a turning operation.

Figure 6:
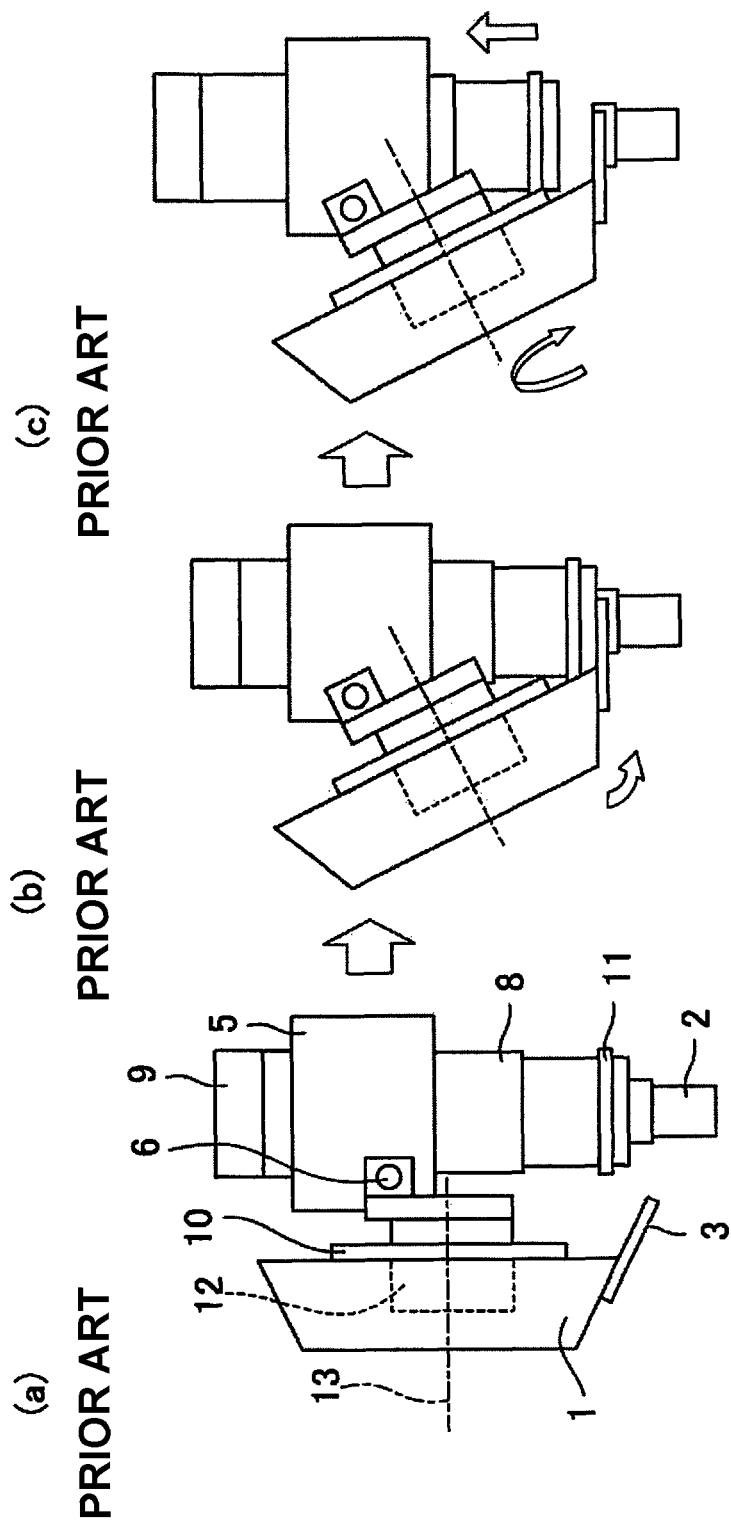
FIGS. 6(a), 6(b) and 6(c) area schematic view when states in which a tool magazine rotationally moves in a direction approaching/separating from a spindle head in the conventional automatic tool changer are viewed from the side.

FIG. 6 is a schematic view when states in which a tool magazine rotationally moves in a direction approaching/separating from the spindle head 8 in the conventional automatic tool changer are viewed from the side and (a) of FIG. 6 shows a separating position and (b) and (c) of FIG. 6 show approaching positions.

When a tool is replaced, the tool magazine 1 performs a rotating operation in a direction allowing to approach the spindle head 8 by rotationally moving around the fulcrum 6. Accordingly, the grip 3 grips the tool 2 mounted on the spindle 7.

Then, the machine tool moves the spindle to connect the tool magazine side gear 10 and the magazine driving motor side gear 11. Accordingly, the tool magazine 1 is enabled to perform a turning operation.

Thus, the processing area can be secured widely by making the tool magazine 1 rotationally movable between the approaching position and the separating position. In addition, the spindle head 8 can be made larger, so that a structure of high stiffness can be obtained.

In the automatic tool changer in this mode, however, a turning operation of the tool magazine 1 can be performed only when the position of the spindle 7 is the position in (c) of FIG. 6. Thus, it is necessary to perform a turning operation of the tool magazine 1 after the grip 3 grips the tool 2 when the position of the spindle 7 is the position in FIG. 6B to move the position of the spindle 7 to the position in FIG. 6C.

Hereinafter, some embodiments of the present invention will be described.

Figure 1:
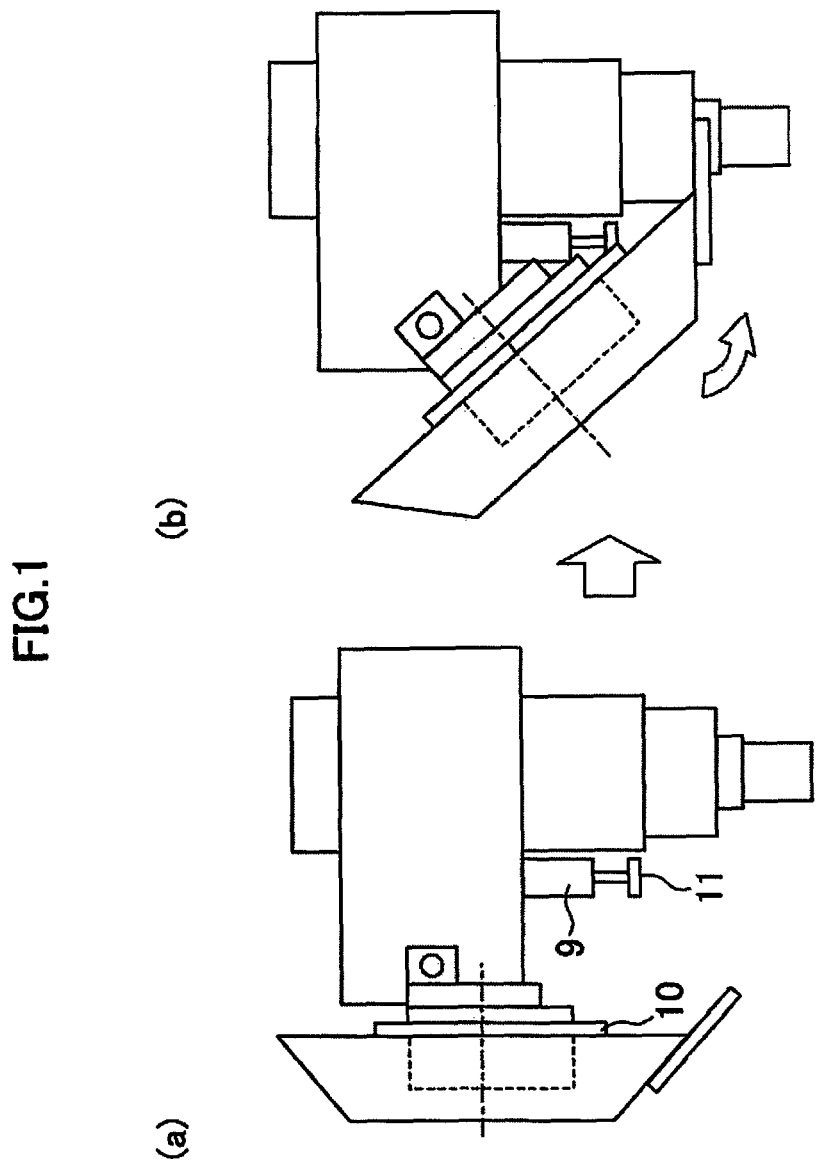
Figure 2:
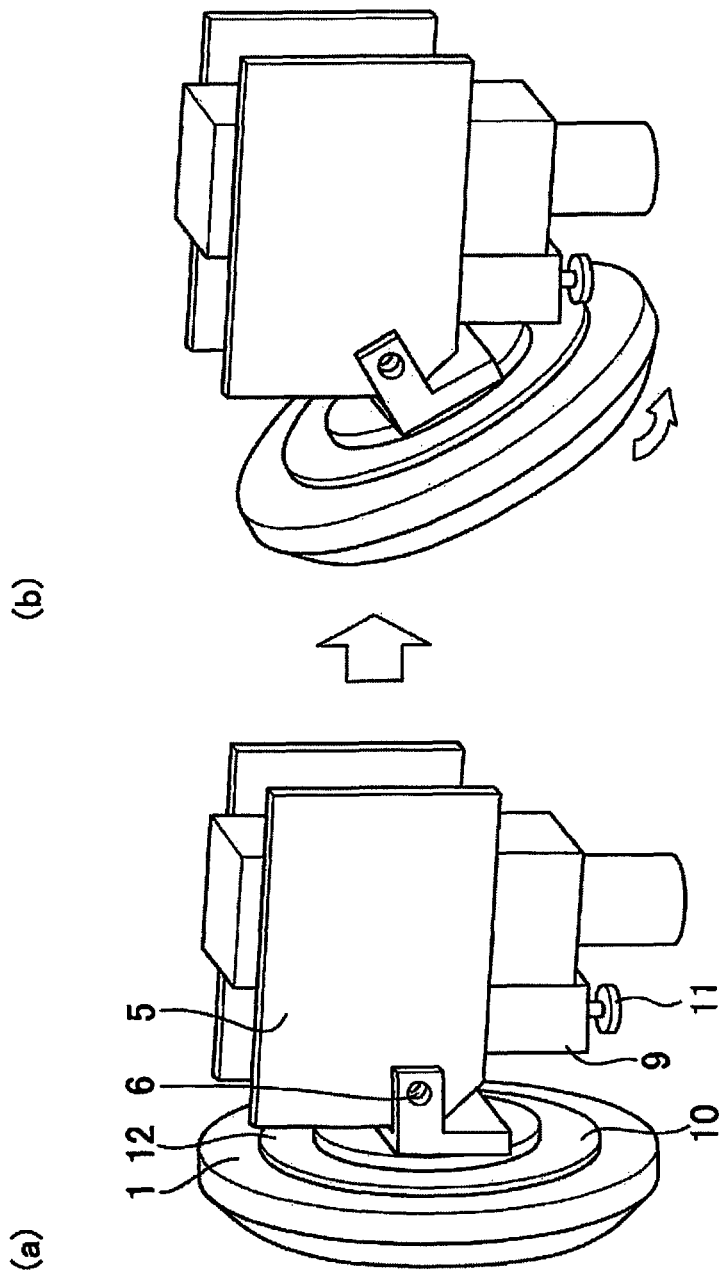
FIGS. 2(a) and 2(b) are a schematic view when the automatic tool changer according to an embodiment of the present invention is viewed from an oblique direction.

FIGS. 1, 2 show a automatic tool changer according to an embodiment of the present invention, FIG. 1 is a schematic view when viewed from a side, FIG. 2 is a schematic view when viewed from an oblique direction, (a) of FIGS. 1 and 2 show a separating position, and (b) of FIGS. 1 and 2 show an approaching position. The tool magazine 1 in the present embodiment is pivotally supported by, like in the conventional technology, the magazine support unit 5 so as to be rotationally movable around the fulcrum 6. Units other than the magazine driving motor 9 are the same as those in the conventional technology and the description thereof is omitted by attaching the same reference numerals.

The present embodiment is configured such that the magazine driving motor 9 is fixed to a non-movable unit of a machine tool and the direction in which the magazine driving motor side gear 11 extends is substantially parallel to the direction in which the spindle 7 extends. By adopting the above configuration, when the tool magazine 1 performs a rotating operation in a direction allowing to approach the spindle head 8, the tool magazine side gear 10 is tilted and engaged with the magazine driving motor side gear 11, so that a turning operation of the tool magazine 1 can be performed.

In the present embodiment, the magazine driving motor 9 and the magazine driving motor side gear 11 are provided in the non-movable unit of the machine tool, instead of the spindle 7, and thus, the tool magazine side gear 10 and the magazine driving motor side gear 11 are configured to be engaged regardless of the positions of the spindle 7 and the spindle head 8. Accordingly, the tool magazine side gear 10 and the magazine driving motor side gear 11 are engaged even if the spindle of the machine tool is not provided in a predetermined position and a turning operation of the tool magazine 1 can be performed when the spindle 7 and the spindle head 8 are positioned anywhere. Because a turning operation of the tool magazine 1 can be performed when the spindle 7 and the spindle head 8 are positioned anywhere, the turning operation of the tool magazine 1 can be started without waiting until the spindle movement of the machine tool stops, so that the tool replacement time can be reduced.

In the present embodiment, the magazine driving motor 9 is provided in the magazine support unit 5 as one of non-movable units of the machine tool, but the installation position of the magazine driving motor 9 is not limited to the above position and may be any position that is a non-movable unit of the machine tool and is not affected by the position of the spindle.

Figure 3:
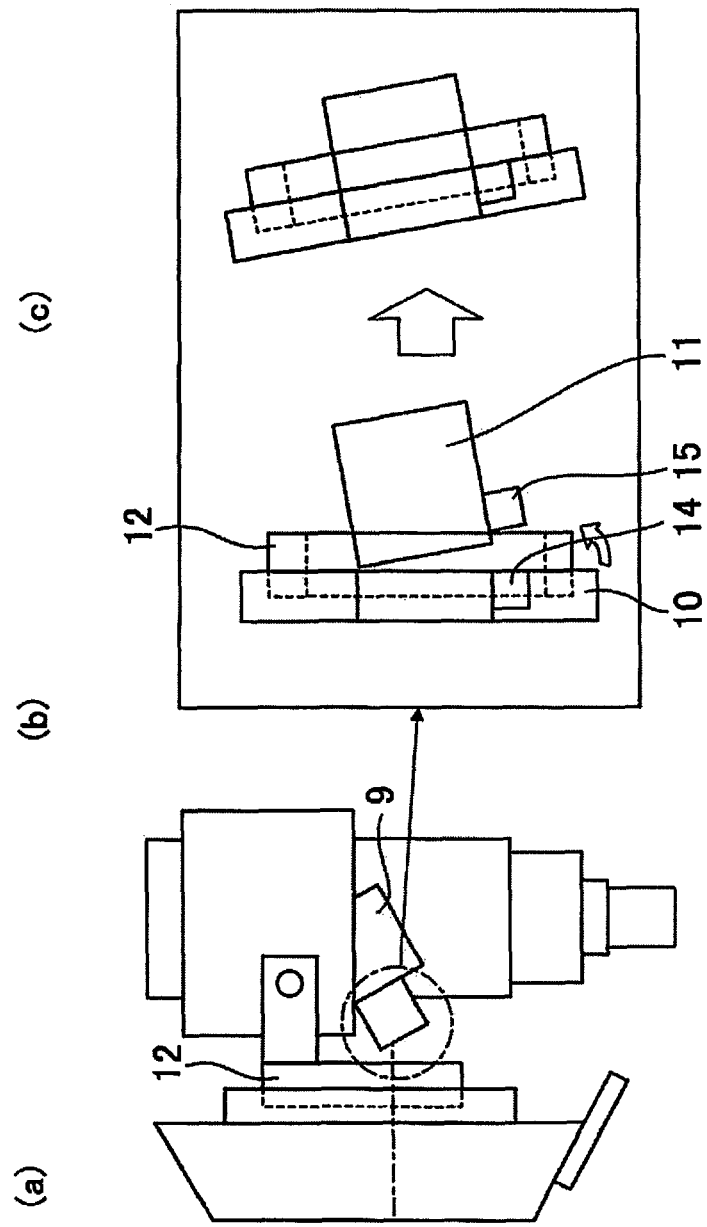
FIGS. 3(a), 3(b) and 3(c) are views showing another embodiment of the present invention.

FIG. 3 is a view showing another embodiment of the present invention. In the present embodiment, the magazine driving motor 9 is fixed to a non-movable unit of a machine tool. When the tool magazine 1 performs a rotating operation in a direction allowing to approach the spindle head 8, the tool magazine side gear 10 is tilted and connected to the magazine driving motor side gear 11. In this case, a key groove 14 is provided in the tool magazine side gear 10 and a key 15 is provided in the magazine driving motor side gear 11. When the tool magazine side gear 10 and the magazine driving motor side gear 11 are connected, the key 15 and the key groove 14 are fitted together. Accordingly, a turning operation of the tool magazine 1 can be performed.

Incidentally, the key 15 is provided in the magazine driving motor side gear 11 and the key groove 14 is provided in the tool magazine side gear 10 in the present embodiment, but the present invention is not limited to the above example. Conversely, an embodiment shown in FIG. 7 in which the key 15 is provided in the tool magazine side gear 10 and the key groove 14 is provided in the magazine driving motor side gear 11 may also be adopted.

An example in which, when the tool magazine 1 performs a rotating operation allowing to approach the spindle 7 in the above embodiment, the tool magazine 1 and the magazine driving motor 9 are connected by a key and a key groove has been described, but the present invention is not limited to such an example. Any configuration in which the tool magazine 1 and the magazine driving motor 9 are connected in conjunction with the approach of the tool magazine 1 to the spindle 7 or the spindle head 8 accompanying a rotating operation thereof is also included in the scope of the present invention.

Also in the above embodiment, a case in which a gear is used as a power transmission mechanism between the tool magazine and the magazine driving motor is taken as an example, but other mechanisms for power transmission that are commonly used may also be used to transmit power between both.

The invention claimed is:

1. An automatic tool changer of a machine tool, the automatic tool changer comprising:
    a spindle head rotatably supporting a spindle;
    a tool magazine including a plurality of grips each configured to hold a respective tool;
    a fulcrum about which the tool magazine is pivotable between
        an approached position in which one grip among the plurality of grips is closer to the spindle head for tool replacement, and
        a separated position in which said one grip is further away from the spindle head; and
    a magazine driving motor configured to turn the tool magazine about an axis for tool indexing when the tool magazine is at the approached position,
    wherein
    the magazine driving motor is fixed to a non-movable unit of the machine tool,
    the spindle head and spindle are movable relative to the non-movable unit,
    the tool magazine includes a first power transmission unit,
    the magazine driving motor includes a second power transmission unit,
    when the tool magazine is at the approached position, the first-power transmission unit and the second power transmission unit are connected with each other for power transmission from the magazine driving motor to the tool magazine to turn the tool magazine about the axis for tool indexing, and
    when the tool magazine is at the separated position, the first power transmission unit and the second power transmission unit are disconnected from each other, and
    wherein the first power transmission unit and the second power transmission unit are configured to be connected with each other when the tool magazine is at the approached position, regardless of the position to which the spindle and the spindle head are moved relative to the non-movable unit.

2. The automatic tool changer according to claim 1, wherein
    the first power transmission unit includes a first gear,
    the second power transmission unit includes a second gear, and
    the first power transmission unit and the second power transmission unit are configured to be connected by the first gear engaged with the second gear when the tool magazine is at the approached position.

3. The automatic tool changer according to claim 1, wherein
    one of the tool magazine and the magazine driving motor includes a key,
    the other of the tool magazine and the magazine driving motor includes a key groove, and
    the first power transmission unit and the second power transmission unit are configured to be connected by the key fitted in the key groove when the tool magazine is at the approached position.

* * * * *